Jan. 15, 1963

D. LA MAR CHRISTY 3,073,607

MACHINE FOR DISPENSING AND DISTRIBUTING
FREE FLOWING COMMINUTED MATERIALS

Filed May 11, 1962

Inventor
Daniel La Mar Christy
By W. J. Kellogg
Atty.

United States Patent Office 3,073,607
Patented Jan. 15, 1963

3,073,607
MACHINE FOR DISPENSING AND DISTRIBUTING
FREE FLOWING COMMINUTED MATERIALS
Daniel La Mar Christy, 404 Dickinson St., Fremont, Ohio
Filed May 11, 1962, Ser. No. 194,123
4 Claims. (Cl. 275—14)

This invention relates to machines for dispensing, by sprinkling or similarly distributing, various edible and/or non-edible materials onto edible and/or non-edible bodies, matters, etc., being an improvement over my invention which is described and claimed in my pending application for Letters Patent, Serial Number 135,658, filed September 1, 1961.

A principal object of the invention is to provide a machine of the above indicated type which will be advantageously and satisfactorily operative for and when used to dispense, by metering and sprinkling or similarly distributing, salt of either fine or coarse mesh, particularly, rock salt of different mesh or granule sizes, on certain kinds of bakery and other food products, such as snack foods including potato chips, corn chips, and the like, its construction being such that the dispensed salt which is of free flowing character, will be exactly metered as to its volume and/or rate of flow onto a receiving product.

An equally important object of the invention is to provide a free flowing material dispensing machine by means of which edible or non-edible materials dispensed thereby or therefrom onto edible or non-edible matters can and will be selectively metered in volume and rate of flow therefrom, hence, asuring amount accurate deposits onto and patterns on said matters, plus effecting desirable cost and production economies to users of the machine.

It is also an object of the invention to provide an advantageous form of flow regulating valve to the machine, whereby materials to be and being dispensed thereby will be supplied to the multiple outlet ports or ways thereof in a manner which will assure constant and even outflowing of materials therefrom and so, assure their distribution over and depositing on receiving bodies or matters in predetermined amounts or quantities, and, if desired, in varying (increased or decreased) amounts or quantities.

Another object of the invention is to provide a machine of the stated character whereby the discharge of free flowing material therefrom will be accurately and advantageously metered both as to volume and/or rate of flow; will be disbursed or distributed in its flow or outflowing therefrom in a manner which will effect a maximum of area coverage relative to a receiving body or matter, and will be further disbursed and/or scattered on said body or matter in a substantially even and uniform manner.

The foregoing, as well as other objects, advantages and meritorious teachings of my invention will be in part obvious and in part pointed out in the following detailed disclosure thereof, when taken in conjunction with the accompanying drawings, it being understood that the form of the invention presented herein is precise and what is now considered to be the best mode of embodying its principles, but that other modifications and changes may be made in specific embodiments without departing from its essential features.

Figure 1:
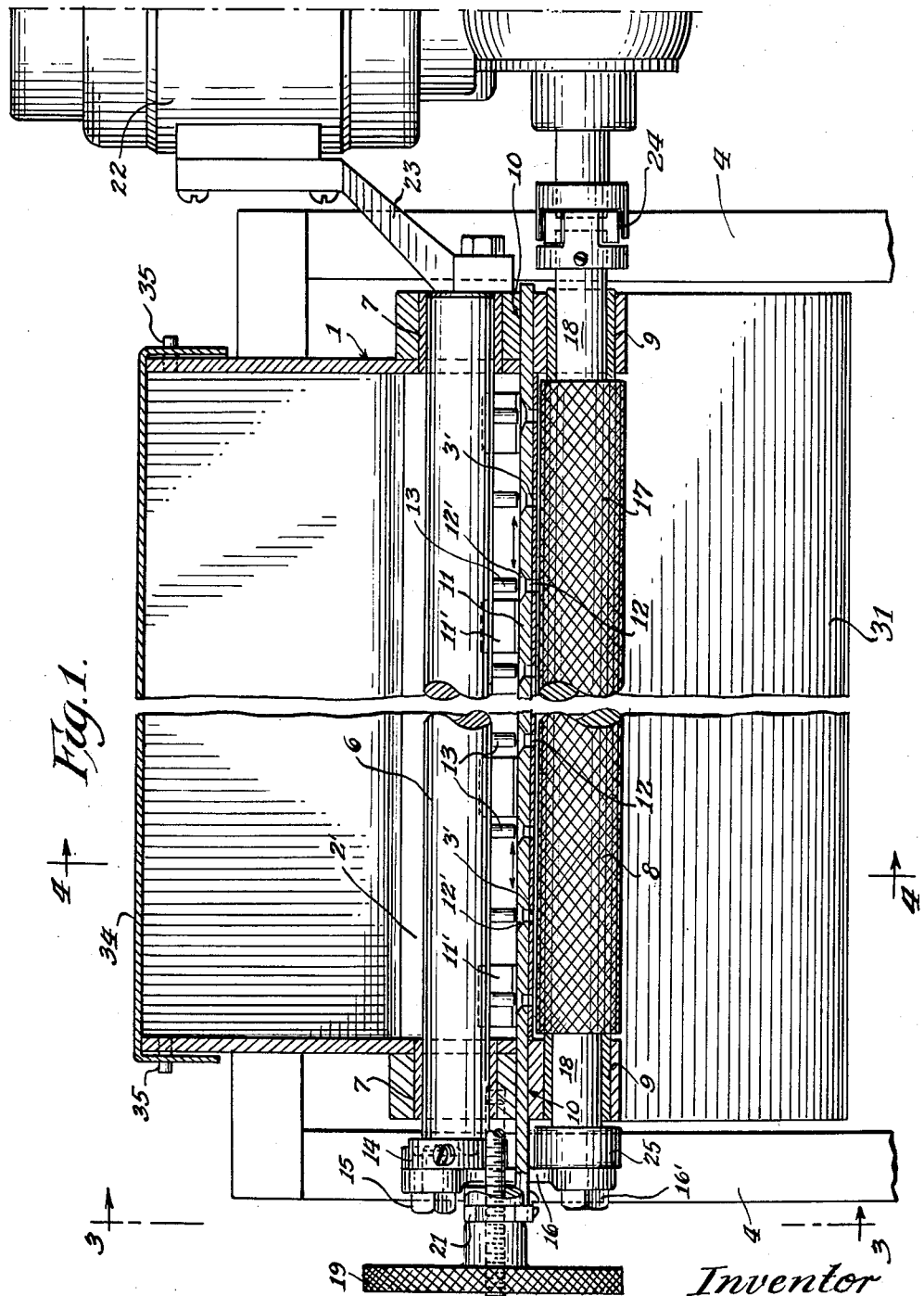
FIGURE 1 is a vertical longitudinal section through the dispensing machine with parts thereof shown in elevation and an intermediate portion broken away.

Referring in detail to the drawings, the improved machine includes in its construction, a hopper 1 of suitable shape and size having downwardly converging side walls 2 and a flat bottom 3 formed throughout its length with relatively equi-spaced discharge openings 3'; supporting legs 4, or their equivalents, fixedly connected at 5 to the hopper side walls; an oscillatory shaft 6 mounted in bearings 7 in lower portions of the hopper end walls adjacent and parallel to its bottom 3, and a material dispensing roll 8 journalled in bearing brackets 9 connected to and supported from the opposite ends of said hopper immediately below its bottom, parallel thereto and cooperable therewith. Correspondingly shaped and sized ways, indicated at 10, are formed in the hopper end walls below the shaft 6, slideably receiving therethrough the opposite end portions of a flat elongated plate valve 11 slideably seated on its flat bottom 3 having discharge openings 12 formed therein corresponding in number and spacing to the bottom discharge openings 3'. It will be noted, in this connection, that the upper portions of the discharge openings 12 are enlarged or reamed as at 12', the purpose of which will be hereinafter more fully described. Metal straps or cleats 11', of angular form, are connected to portions of the hopper body lower and converging side walls, as by spot welding or other suitable means. Their lower extremities are engaged over the plate valve 11, thus, retaining it slideably seated on the flat bottom 3.

Figure 2:
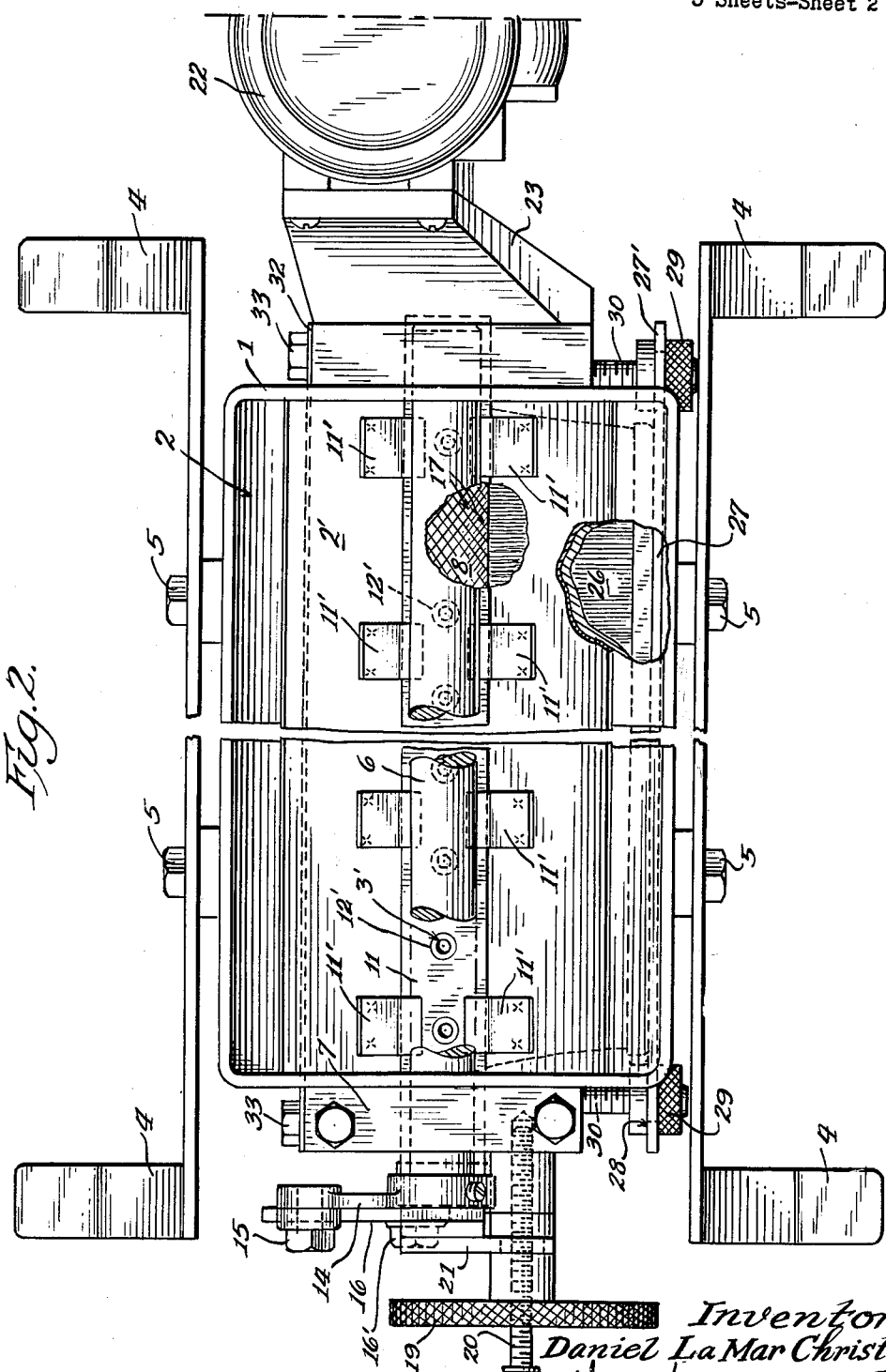
FIGURE 2 is a top plan view of the same.
Figure 3:
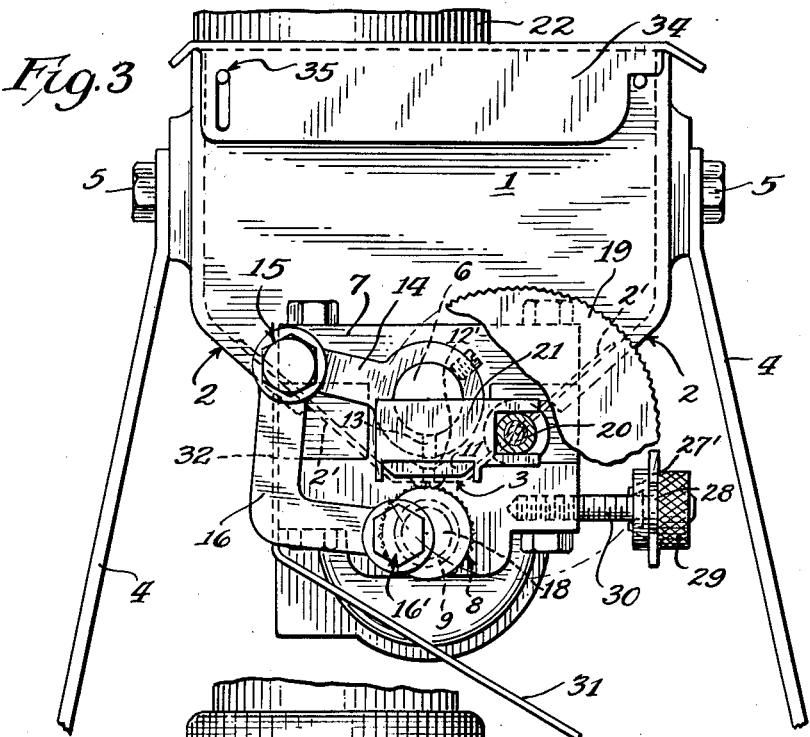
FIGURE 3 is a vertical section taken on the line 3—3 of FIGURE 1, looking in the direction in which the arrows point, and, FIGURE 4 is a vertical transverse section taken on the line 4—4 of FIGURE 1, looking in the direction in which the arrows point.
Figure 4:
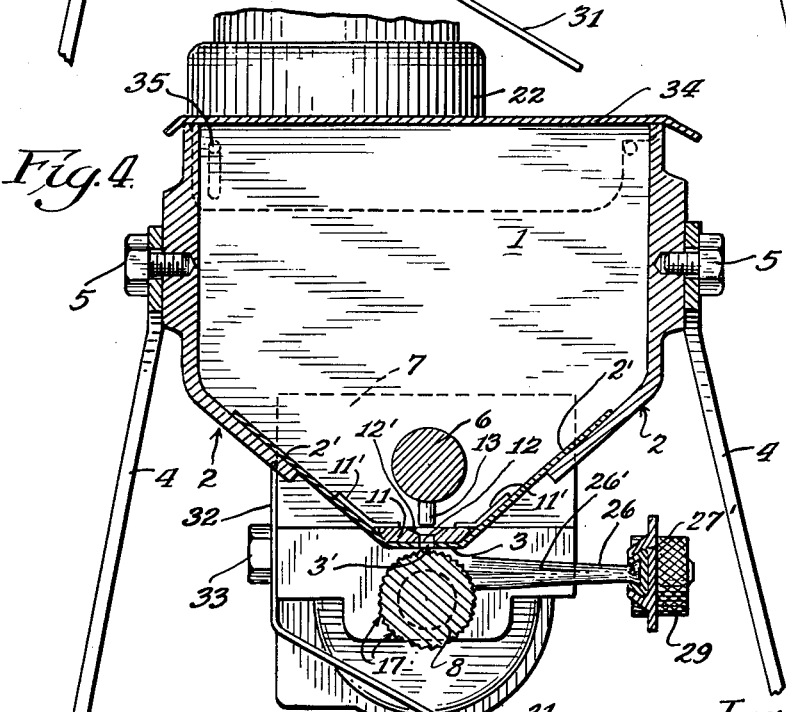

As stated above, the side walls 2 of the hopper converge downwardly, this for an obvious purpose. They are of composite construction to the extent that their upper portions are preferably integral with the upper part of the hopper body. The lower portions thereof and the relatively narrow and flat bottom 3 are of one piece, substantially V-shaped, and of length corresponding to that of the hopper, as indicated at 2'. It can well and economically be made by forming or stamping the same from sheet metal, shown in the present embodiment to be of gauge less than the material of the hopper body, wherein rigidity is of the essence. The wing portions of the piece are of widths such that when it is nested in the lower portion of the hopper body, they will lie in overlapping relation to and on adjacent portions thereof, as shown in FIGURES 2 and 4 of the drawings. Said overlapping parts are secured to the hopper body, as by spot welding or other suitable means.

Being separate from the hopper body, it will be understood that the piece 2' can be removed, as and when required for repair, replacement, etc.

The oscillatory shaft 6 carries a plurality of longitudinally aligned agitating fingers 13, preferably spaced therealong to overlie the plate valve discharge openings 12—12'. One end of said shaft is extended beyond the adjacent hopper end wall and fixedly mounts an arm 14 thereon, the outer end of which is pivotally connected, at 15, to an angularly formed arm 16.

The dispensing roll 8 is provided over its entire peripheral surface with a multiplicity of uni-sized pockets 17. The shapes and sizes of these openings are such as will receive dry granular free flowing material from the hopper 1 via the discharge openings in the slideable plate valve 11 and the discharge openings 3' in the hopper bottom. Coaxially disposed stub-axles 18 are formed upon or otherwise provided to the opposite ends of the dispensing roll. They are, as hereinbefore indicated, journalled in the hopper supported bearings 9.

The length of the slideable plate valve 11 is greater than that of the hopper 1 and its bottom 2. Thus, one end portion thereof extends through and beyond the adjacent end wall way, as shown in FIGURES 1 and 2 of the accompanying drawings. In order that slideable motion may be selectively imparted to it, a hand wheel 19 is threadedly engaged with a screw threaded shank 20 fixedly mounted or engaged in the adjacent end wall of the hopper 1. A forked member 21 is connected to the near and extended end of the plate valve transversely thereof and is loosely engaged in an annular way formed in the hand wheel hub. Hence, with rotation of said wheel, it will be moved either inwardly or outwardly on the screw threaded shank 20 and in so doing, effect sliding of the plate on the hopper flat bottom 3. Thereby, the discharge ways in the valve will be selectively aligned, partially aligned, or disaligned with and/or from those in the hopper bottom, controlling the extent or quantity of flow of dry granular matter from said hopper onto the peripherally pocketed roll 8.

To impart rotary motion to the dispensing roll 8, an electric drive motor 22 is preferably mounted on the hopper end wall opposite the hand wheel 19 by means of a bracket 23. Its armature shaft is drivingly connected to the near stub-axle 18 of said roll by a suitable coupling 24.

Rotary motion transmitting connection between the driven dispensing roll 8 and the shaft 6 is effected by fixedly mounting a collar 25 on the opposite or remaining stub-axle 18 thereof and pivotally connecting the free end of the angular arm 16 thereto eccentrically of its axis of rotation, as at 16'. Thereby, as and when the roll is rotated by the driving motor 22, the angle arm will be rocked and will transmit oscillatory motion to the shaft 6 via the arm 14 mounted thereon causing the material agitating fingers 13 to be rocked forwardly and backwardly over the discharge openings 12 in the material flow regulating or control slideable plate valve 11, assuring the constant movement of material contained within the hopper into the enlarged or reamed upper portions 12' of said plate valve openings 12. Obviously, because of the enlarging of the valve openings 12, as indicated at 12', the flow of granular material within the hopper thereinto will be improved.

A brush 26 is supported in horizontal position on the machine below its hopper and longitudinally of and parallel to the dispensing roll 8 by means of a head bar 27 whose opposite ends are extended and forked, as at 27', for engagement in peripheral channels 28 formed in circular nuts 29 threadedly received on screws 30 fixedly engaged in and disposed outwardly from portions of the dispensing roll bearings 9. The brush bristles 26' are in adjustable sweeping contact with adjacent portions of the dispensing roll pocketed periphery. Consequently, with rotation of the roll, granular or like material metered and discharged thereonto from the plate valve controlled discharge openings 3' will be swept therefrom.

In order that material dispensed or discharged from the brush swept roll 8 will be more evenly distributed onto a receiving body therebelow, an obliquely and downwardly disposed deflecting plate 31 is positioned below and throughout the length of said roll, being supported by or from the hopper by flanging one side thereof, as at 32, and engaging securing screws 33, or the like, therethrough and preferably with adjacent portions of the dispensing roll bearings 9.

The open upper end of the hopper 1 is normally closed by a cover 34 swingably connected, as at 35, to one side and upper portion of said hopper.

It is believed that the operation of my improved distributing machine will be understood from the preceding description. However, and for clarity in this connection, it will be understood that with energization of the electric driving motor 22 by means of suitable electric circuit control (not shown), rotary motion will be transmitted to the dispensing roll 8. This motion, in turn, will be transmitted to the shaft 6, causing it to be oscillated and the agitating fingers 13 to stir or agitate granular material within the hopper, thus assuring its movement onto the valve plate 11 and into the discharge openings 12—12' and 3'. The thus discharged granular material, falling onto the peripherally pocketed and now rotating dispensing roll 8 will be conveyed outwardly and discharged downwardly therefrom. The previously adjusted brush 26, with its bristles 26', engaging the dispensing roll 8 will absolutely ensure sweeping of said granular material therefrom, dropping it onto the deflecting plate 31 from whence it will be further dispersed and distributed onto and over a receiving body or matter therebelow (not shown).

At this point, it should be noted that the dispensing machine is supported, in any suitable manner, over or above a travelling conveyor (not shown) on which bodies or matters to be "dusted" or otherwise provided with topping materials from the machine are carried. Hence, as these conveyor carried bodies or matters pass beneath the dispensing machine, their surfaces will be sprinkled or otherwise provided with a topping material—either edible or non-edible.

It is to be also noted that my improved dispensing machine may be used to dispense edible and/or non-edible flowable materials onto edible and/or non-edible bodies or matters, such as conditions or preference may or shall dictate.

I claim:
1. A machine for dispensing and distributing flowable material onto a receiving body, comprising:
   (a) a hopper having size regulatable material discharge ways in the bottom thereof,
   (b) an oscillatory agitating shaft journalled in bearings in the opposite end walls of the hopper disposed longitudinally of and within said hopper in proximity and substantially parallel relation to said way,
   (c) a rotatable peripherally pocketed dispensing and distributing roll mounted on and without the hopper disposed longitudinally thereof in communicative relation to its bottom and said discharge ways,
   (d) motion transmitting means arranged exteriorly of the hopper interconnecting the roll and the shaft,
   (e) other means supported by the hopper exteriorly thereof engaging said roll whereby to remove flowable material therefrom, and,
   (f) still other means supported by the hopper below said roll upon which material from the roll is impinged, scattered and passed therefrom onto the receiving body.

2. A machine for dispensing and distributing flowable material onto a receiving body, comprising:
   (a) a hopper having size regulatable material discharge ways in the bottom thereof,
   (b) oscillatory agitating means mounted within the hopper cooperable with said discharge ways,
   (c) a rotatable peripherally pocketed dispensing and distributing roll mounted on the hopper below its bottom in communicative relation thereto and to the discharge ways therein,
   (d) motion transmitting means interconnecting the roll and the oscillatory agitating means, and,
   (e) a brush supported by the hopper adjustable toward and away from said roll and engageable therewith whereby to remove flowable material therefrom.

3. A machine for dispensing and distributing flowable material onto and over a receiving body, comprising:
   (a) a hopper having a substantially flat bottom formed with a plurality of relatively longitudinally spaced discharge ways substantially throughout its length,
   (b) an elongated plate flushly and slideably received and supported adjacent said bottom having one end portion thereof extended beyond the adjacent end of the hopper, said plate being formed with a plurality of discharge ways spaced to coincide with the spacing of the ways in said bottom and registrable, at times, therewith, the upper portions of the second mentioned ways being larger than their respective lower portions, (c) means mounted exteriorly of and on the hopper connected to said extended end of the elongated plate whereby to impart longitudinally slideable motion thereto in either of two directions, (d) an oscillatory shaft journalled in bearings in the opposite walls of the hopper disposed longitudinally of and within said hopper in proximity and substantially parallel relation to the ways therein, (e) said shaft having a plurality of relatively longitudinally spaced downwardly disposed fingers thereon, (f) a rotatable peripherally pocketed distributing and dispensing roll mounted on and without the hopper disposed longitudinally thereof in communicative relation to its bottom and said elongated plate, (g) motion transmitting means interconnecting the roll and the shaft, (h) means supported by the hopper exteriorly thereof engaging said roll throughout its length whereby to remove flowable material therefrom, and, (i) a plate supported by the hopper in downwardly obliqued and spaced relation to its bottom and underlying said roll upon which material removed from the roll is impinged upon, scattered and passed therefrom onto the receiving body.

4. A machine for dispensing and distributing flowable material onto and over a receiving body, comprising:

(a) a hopper having a substantially flat bottom formed throughout its length with a plurality of relatively longitudinally spaced discharge ways, (b) an elongated plate flushly and slideably received by and supported adjacent said bottom having one end portion thereof extended beyond an adjacent end of the hopper, said plate being formed with a plurality of discharge ways spaced to coincide with the spacing of the ways in said bottom and registrable, at times, therewith, the upper portions of the second mentioned ways being larger than their respective lower portions, (c) means mounted exteriorly of and on the hopper connected to said extended end of the elongated plate whereby to impart longitudinally sliding adjusting motion thereto, (d) oscillatory agitating means mounted within the hopper disposed longitudinally of and in proximity and substantially parallel relation to the ways in its bottom, (e) a rotatable peripherally pocketed distributing and dispensing roll mounted on the hopper below its bottom and said elongated plate and in communicative relation thereto, (f) motion transmitting means interconnecting the roll and the oscillatory agitating means, (g) a brush supported by the hopper adjustable toward and away from said roll and engageable therewith whereby to remove flowable material therefrom, and, (h) a downwardly disposed and discharging deflecting plate connected to the underside of and supported by said hopper underlying said roll and brush upon which material removed from the roll is impinged upon, scattered and passed therefrom onto the receiving body.

References Cited in the file of this patent

UNITED STATES PATENTS

| 137,051 | Caine | Mar. 25, 1873 |
| 838,267 | McWhorter | Dec. 11, 1906 |
| 1,753,811 | Stolle | Apr. 8, 1930 |
| 2,906,438 | Carpenter | Sept. 29, 1959 |

FOREIGN PATENTS

| 323,670 | Great Britain | Jan. 9, 1930 |